Sept. 10, 1968 R. H. KAROL 3,400,464
INCLINATION INDICATOR
Filed May 11, 1966
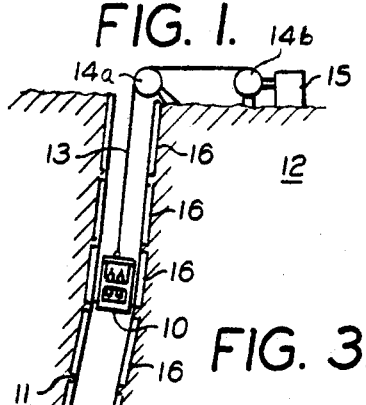
FIG. 1.
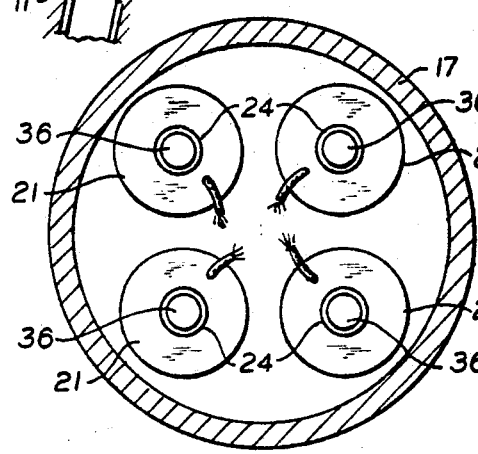
FIG. 3.
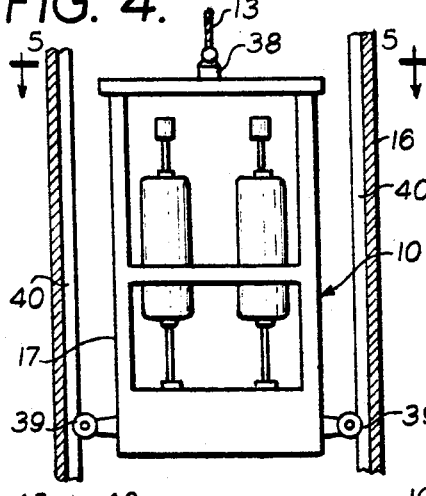
FIG. 4.
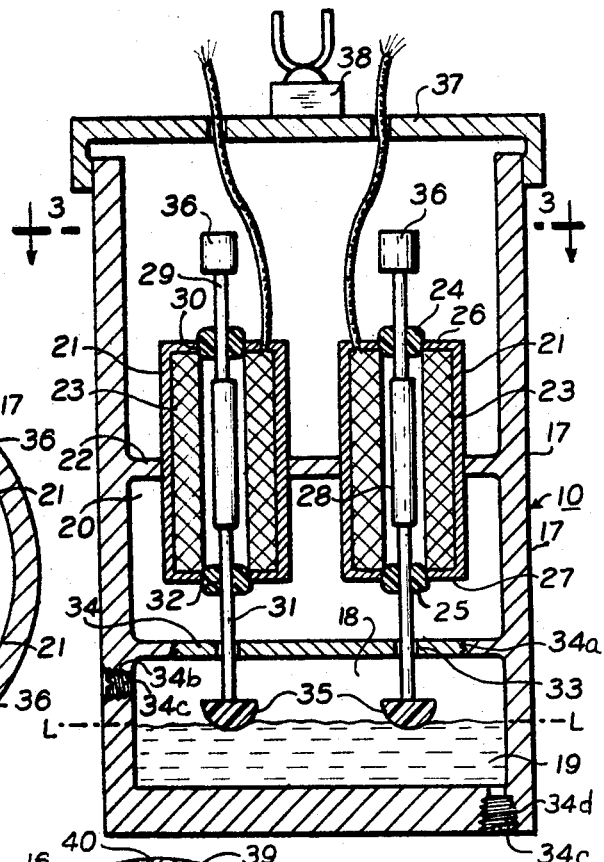
FIG. 2.
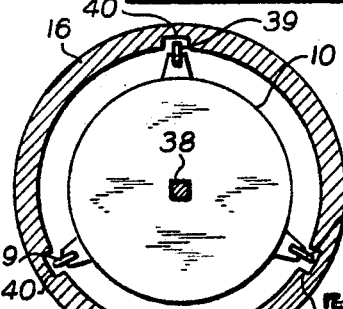
FIG. 5.
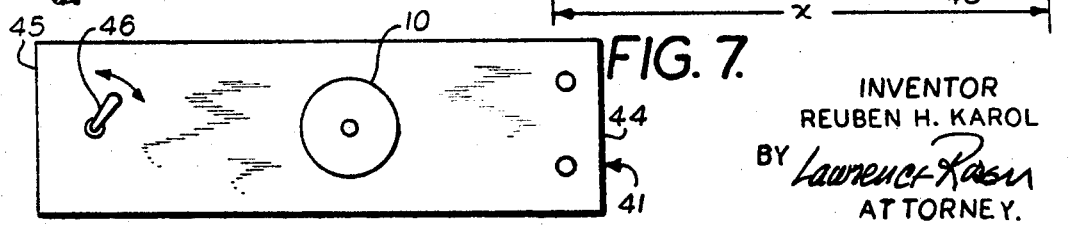
FIG. 6.
FIG. 7.
INVENTOR
REUBEN H. KAROL
BY Lawrence Rosen
ATTORNEY.

United States Patent Office 3,400,464
Patented Sept. 10, 1968

3,400,464
INCLINATION INDICATOR
Reuben H. Karol, 261 S. Adelaide Ave.,
Highland Park, N.J. 08904
Filed May 11, 1966, Ser. No. 549,204
10 Claims. (Cl. 33—205)

ABSTRACT OF THE DISCLOSURE

An inclination determining device for measuring the settlement or lateral movement of earthen structures or the like. The device comprises a plurality of differential transformer means positioned within a housing and provided with armature core rod members, floatingly supported on a pool of mercury, which are movable through their respective armatures in response to fluctuations in the level or slope of the mercury liquid.

---

This invention relates to devices for testing earthen structures or the like, and in particular, to an improved measuring instrument for determining the settlement or lateral movement of such structures at various points and levels.

In the construction of structures built of earth or soil, particularly large structures such as earth dams, foundations, dikes or levees, it becomes frequently necessary to determine the long term performance and safety factor of the structures during the course of construction. In order to predict these factors with a satisfactory degree of accuracy, instruments are inserted into the earth mass which facilitate certain measurements to be taken during the life of the structures. Of particular significance and importance is the measurement and determination of the settlement and internal lateral movement of the earth mass within the structures. Instruments which are adapted to measure the shifting or lateral movement of structures, such as earthen dams, dikes and levees are widely known and used. Among these instruments are devices adapted to be lowered into bore holes or pipes provided in the structures at predetermined locations. As these instruments are lowered, they measure changes in the slope of the bore holes, which are generally indicative of settlement and movement within the earthen structure and possibly detect significant and potentially dangerous increases in internal stresses in the structure.

In the prior art, varied types of measuring devices or instruments are employed in testing the earthen structures with regard to their internal strains or movement. Some of these known instruments utilize caliper-type components adapted to engage the walls of the bore holes in order to establish an indication of internal soil shifting or lateral movement of the structures being tested. Other instruments measure the internal lateral movement of earthen structures through measurement of the angular deviation or changes in the slope of the bore holes provided in the structures. Many of these instruments indicate and record these internal lateral movements and strains of the earthen structures or soil by means of electrical currents, impulses or signals generated by the measuring instruments and transmitted to suitable recording and indicating devices which will deduce the stresses produced by the strains.

Although the aforedescribed measuring devices and instruments are widely known and used in industry, various problems have been encountered in their manufacture and use. A major problem prevalent in the prior art measuring and testing devices is that they are not sufficiently accurate in the measurement and recording of earthern structure strains and lateral movement. This inherent drawback is due to the complex mechanical construction of the known instruments frequently resulting in malfunctions of the mechanical or electrical components. The prior art measuring instruments have also been found difficult to accurately calibrate during manufacture, all of which has rendered the precise testing of internal strains in the soil and earthen structures to be highly difficult, and in some instances, quite impossible. None of the foregoing measuring and testing instruments have been able to achieve the desired degree of accurate calibration and reliability needed in the determination of critical internal strains and lateral movement of earthen structures.

The measuring instrument and inclination indicator according to this invention overcomes the foregoing and other problems encountered in the prior art by providing a novel and improved indicator and measuring device of relatively simple and efficient construction utilizing extremely sensitive and accurately calibrated differential transformers.

A feature of the measuring instrument of the present invention lies in the provision of a compact housing having a plurality of differential transformers therein and being capable of measuring accurate, precise changes in the slope of the instrument during movement through a bore hole or pipe in the earthen structure to be tested. The accuracy of the instrument extends to the measuring of even the most minute quantities or degrees of angular deviation from its initial basic upright position.

Another important aspect or feature of the instrument according to the present invention is that the differential transformers of the instruments have reciprocable armature core rod members which have gravity floats on their lower ends adapted to be supported by a pool of mercury or other liquid in said housing. This will permit the reciprocating movement of the armature core members through their respective armatures in response to variations in the level of the mercury pool caused by the changes in slope or inclination of the instrument housing during ascending or descending movement in earthen structure bore holes.

It will also become readily apparent to any one skilled in the art that the indicating or measuring instrument according to this invention may be simply and accurately calibrated through the provision of a pair of calibration plates on which the instrument may be readily mounted. In essence, this will obviate the need for expensive and complex calibrating equipment and tools heretofore required in calibrating prior art measuring devices. From the foregoing, it may thus be readily ascertained that the inclination indicator or measuring instrument according to this invention is of an inexpensive, simple construction permitting the accurate testing of various types of soil or earthen structures internal strains and lateral movements.

It is accordingly, an object of the present invention to provide a novel and unique inclination indicating and measuring instrument for measuring internal strains and lateral movement in an earthen structure.

Another object of the present invention is to provide a measuring instrument possessing a high degree of precision in measurement through the utilization of a plurality of differential transformers in the instrument.

Still another object of the present invention is to provide an inclination indicating and measuring instrument utilizing a plurality of differential transformers having armature core rod members floatingly supported on a pool of mercury liquid and movable through their respective armatures in response to fluctuations in the level or slope of the mercury liquid.

Yet another object of the present invention is to provide an inclination indicating and measuring instrument adapted to be readily, simply and accurately calibrated for precise measurement.

The manner in which these and other objects and advantages of this invention will be obtained will become apparent from the following detailed description and drawings in which:

FIG. 1 is a sectional elevation, partly in schematic form of a typical device according to this invention placed in a bore hole;

FIG. 2 is an enlarged sectional elevation of the device illustrated in FIG. 1;

FIG. 3 is a sectional plan view on line 3—3 of FIG. 2;

FIG. 4 is an enlarged sectional elevation of the device illustrated in FIG. 1 and showing further details of construction;

FIG. 5 is a sectional plan view on line 5—5 of FIG. 4;

FIG. 6 is a sectional elevation of a typical device according to this invention positioned on calibration plates; and FIG. 7 is a plan view on line 7—7 of FIG. 6.

Referring now in particular to the drawings, FIG. 1 shows an inclination indicating and measuring instrument 10 positioned in a bore hole 11 in earth structure 12. The measuring instrument 10 may be lowered or raised in the bore hole 11 by means of a cable 13 to which the measuring instrument 10 is attached. Cable 13 is trained over a pulley 14a and pulley 14b on the surface of earth structure 12 and activated through a motor or prime mover 15. Markings may be provided on the cable which will indicate the depth to which measuring instrument 10 has been lowered in bore hole 11.

Bore hole 11 may be lined with vertically contiguous jointed sections of pipe 16 formed of suitable material, such as metal, ceramic or the like. Preferably, the sections of pipe 16 are of relatively short lengths and should be joined so as to permit some vertical play between adjacent pipe section joints. The use of short sections of loosely jointed pipes 16 will facilitate the measurement of slope from pipe section to pipe section along the entire vertical height of the earthen structure 12, since the pipe sections 16 will move in accordance with the amount of lateral compression or movement of the entire structure.

The measuring instrument 10, as shown in more particular detail in FIG. 2, comprises a suitable housing 17 of generally cylindrical configuration. Housing 17 has a closed chamber 18 in its lower portion, said chamber 18 containing a quantity of liquid mercury 19 extending up to a liquid level L.

Above chamber 18, housing 17 forms a substantially cup-shaped chamber 20. Four cylindrical differential transformer casings 21 are positioned in chamber 20 and fastened to the housing 17 by means of a flange member 22. The transformer casings 21 are in spaced relationship to each other and are circumferentially equidistant within housing 17 at 90° intervals so as to form four quadrants. Armature coils 23 are positioned in each of the transformer casings 21 and are retained against longitudinal movement relative thereto through the insertion of nylon washers 24, 25 in respectively the upper and lower walls 26, 27 of transformer casings 21.

Elongated transformer core rod members 28 extend vertically through each of the armature coils 23, and have upwardly projecting extensions 29 passing through openings 30 in the nylon washers 24. Similarly downwardly projecting extensions 31 of the core rod members 28 pass through openings 32 in nylon washers 25. Extensions 31 are of sufficient length to extend into chamber 18 through suitable openings 33 in closure member 34. The closure member 34 may comprise a rigid metallic plate adapted to be fastened to housing 17 to thereby form the closed chamber 18. The fastening of closure member 34 to housing 17 may be by means of co-acting threads 34a, or other fastening devices, such as screws, bolts, etc., well known in the art. If desired, instead of a rigid metallic plate, closure member 34 may consist of fine wire mesh screen, formed of, for example, No. 200 wire mesh which is fine enough to prevent the liquid mercury 19 from splashing up out of chamber 18.

An opening 34b in the side of housing 17 and leading into the upper portion of chamber 18 may be provided in order to facilitate filling the chamber 18 with the liquid mercury 19. Opening 34b is closed and sealed by means of a threaded plug member 34c placed therein for that purpose.

To remove the liquid mercury 19 from chamber 18 as may be required during storage or transportation of the instrument 10, a drain hole 34d may be provided in the bottom or side wall of housing 17 at the lower extremity of chamber 18. Drain opening 34d may be closed and sealed through the use of a threaded plug member 34c similar to that placed in opening 34b. The lower ends of the core rod member extensions 31 have hemispherical nylon metal, or plastic floats 35 fastened thereon which permit the core rod members 28 to be supported by the liquid mercury pool 19. The level L of the liquid mercury 19 is maintained at a predetermined height whereby when housing 17 is upright, the core rod members 28 are centered in neutral positions relative to their respective armature coils 23.

The upper distal ends of upwardly projecting extensions 29 include weights 36 in order to maintain a downward or gravitational force on the core rod members 28. Housing 17 is closed by means of a suitable cover member 37. Cover member 37 provides for a cable attachment 38 of a preferably universal-joint swivel type which will permit a wide latitude of movement for cable 13 fastened thereto. Suitable openings may be provided in cover member 37 for the electrical cables containing lead wires which will connect the differential transformers with suitable electrical recording and measuring devices (not shown).

In order to assure the instrument 10 of maintaining an accurate degree of measuring during its descent through a bore hole 11, it is desirable that provisions are made to maintain it in a predetermined oriented relationship whereby torsional movements about the instrument axis be avoided. Thus, housing 17 may have a plurality of wheels 39, which may comprise ball bearings, mounted radially outwardly thereof in a circumferentially spaced relationship, and with said wheels 39 being adapted to ride in vertically extending guiding grooves 40 provided in the inner walls of pipes 16. In order to prevent possible jamming of wheels 39 in grooves 40, at least some of the wheels 39 should be resiliently mounted on housing 17.

The operation of the aforedescribed apparatus is as follows:

Instrument 10 is lowered into a bore hole 11 wherein the lateral movement of the earthen structure is to be measured. A predetermined electrical current is induced in the differential transformers. Signal receiving means may be provided in the nature of an extremely sensitive ammeter (not shown) which measures the amount of current induced in the differential transformers. A converter (not shown) may be connected to the transformers; which takes the signals put out by the differential transformers, amplifies them and modifies them so that they can be read on the ammeter.

When the instrument 10 reaches a portion of bore hole 11 or pipe 16 which is angularly inclined due to lateral movement of the earthen structure 12, housing 17 is similarly inclined. Since the level of the liquid mercury 19 always remains horizontal and the core rod members 28 are supported thereon, there will be movement of the core rod members 28 relative to their respective armature coils 23. Depending on the direction of inclination of housing 17 there will be an unequal displacement of the various core rod members 28 with respect to the armature coils 23. This unequal displacement will in turn cause a variation in the electrical signal being transmitted to the signal receiving means. If the instrument 10 has been previously calibrated, the difference in electrical signal output may be readily converted into mechanical data recording the slope of the bore hole 11, lateral movement compression and internal strain of the earthen structure.

Readings as aforedescribed may be taken at various elevations or soundings and in different bore holes in order to present a composite data grid relating to the conditions and performance of the earthen structure 12.

Calibration of the instrument 10 may be attained in a relatively simple manner. The instrument is mounted on a calibration rig 41 consisting essentially of two superimposed rigid steel plates 42, 43. The plates 42, 43 are of an elongated rectangular configuration and are fastened together at one end 44 in a fashion that permits rotation without restraint. Near the opposite end 45, a rotatable bolt 46 is adapted to elevate plate 42 above plate 43 into an angularly inclined position. A predetermined amount of rotation of bolt 46 will generate an angle of inclination $\theta$ between plates 42 and 43. A similar angle $\theta$ will be imposed on instrument 10 mounted on plate 42 and as a result there will be a change in the signal output of the differential transformers which may be recorded on the ammeter connected therewith. Through varying angle $\theta$ as a trigonometric function of turning bolt 46 and the fixed distance $x$ between bolt 46 and the point of attachment between the plates 42 and 43, while concurrently recording the signal outputs of the differential transformers, a calibration chart may be obtained for instrument 10.

From the foregoing it thus readily appears that the inclination indicator and measuring instrument 10 is of an exceedingly sensitive, accurate nature, adapted to be calibrated in a simple and expedient manner.

Although the instrument has been described with reference to four differential transformers, it will be readily apparent to one skilled in the art that the invention may be practiced with a lesser or greater amount of transformers as desired.

While particular embodiments of this invention are shown above, it will be understood that the invention is obviously subject to variations and modifications without departing from its broader aspects.

What is claimed is:

1. An instrument for measuring the lateral displacement of an earthen structure or the like, adapted to be lowered into a bore in said structure, comprising a generally upright housing, a plurality of differential transformer means positioned within said housing, each of said differential transformer means including an armature fastened to said housing, a core rod member adapted to vertically extend through said armature and being longitudinally movable relative thereto, said differential transformer means inducing a predetermined amount of electrical current, said housing including closed chamber means in its lower portion, and a liquid in said chamber means filling said chamber to a predetermined level when said housing is in its upright position, the lower end of each of said core rod members extending into said chamber means and being supported by said liquid, angular inclination of said instrument from its upright position moving each of said core rod members relative to its respective armature in response to inclinations of the level of the said liquid relative to said housing, thereby effecting changes in the current induced in each of said differential transformer means.

2. The instrument defined in claim 1 wherein said liquid is constituted of mercury.

3. The instrument defined in claim 1 including four of said differential transformer means spaced equidistant to each other at 90° intervals within said housing.

4. The instrument defined in claim 1 wherein each of said core rod members includes a weight fastened to its upper distal end, said weight being adapted to maintain said core rod members in contact with said liquid under the influence of gravity.

5. The instrument defined in claim 1 wherein each of said core rod members include enlarged hemispherical lower end portions adapted to maintain said core rod members in floating engagement upon said liquid.

6. The instrument defined in claim 5 wherein said enlarged hemispherical portions are constituted essentially of nylon.

7. The instrument defined in claim 1 wherein each of said differential transformer means include a plurality of nylon washers adapted to centrally align each of said core rod members within their respective armatures irrespective of the angular inclinations of said instrument.

8. The instrument defined in claim 1 wherein said bore is lined with vertically contiguous lengths of pipe, the inner diameter of said pipes being larger than the outer peripheral dimensions of said instrument.

9. The instrument defined in claim 8 wherein said lengths of pipe include at least one vertical groove extending for substantially the depth of the bore, said instrument having at least one radially projecting member guided in said groove whereby torsional movement of said instrument in said bore is restricted.

10. The instrument defined in claim 9 wherein said radially projecting member comprises wheel means adapted to be rotatably driven in said groove in response to vertical movement of said instrument in said bore.

References Cited

UNITED STATES PATENTS

| 1,590,287 | 6/1926 | De Giers | 73—311 X |
| 2,806,295 | 9/1957 | Ball. | |
| 2,903,678 | 9/1959 | Wills | 73—313 X |
| 2,940,177 | 6/1960 | Bricaud. | |

HARRY N. HAROIAN, *Primary Examiner.*